US008634758B2

(12) United States Patent
Sato

(10) Patent No.: US 8,634,758 B2
(45) Date of Patent: Jan. 21, 2014

(54) PRINTING SYSTEM, JOB PROCESSING METHOD, STORAGE MEDIUM, AND PRINTING APPARATUS

(75) Inventor: Masayuki Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 911 days.

(21) Appl. No.: 12/236,370

(22) Filed: Sep. 23, 2008

(65) Prior Publication Data

US 2009/0087242 A1 Apr. 2, 2009

(30) Foreign Application Priority Data

Sep. 27, 2007 (JP) ................................. 2007-251314

(51) Int. Cl.
*G03G 15/00* (2006.01)
*G06F 3/12* (2006.01)

(52) U.S. Cl.
USPC .......................................... 399/407; 358/1.15

(58) Field of Classification Search
USPC ........................................................ 399/407
See application file for complete search history.

(56) References Cited

U.S. PATENT DOCUMENTS

| | | | | |
|---|---|---|---|---|
| 7,245,845 | B2 * | 7/2007 | Isobe et al. | 399/82 |
| 8,004,702 | B2 * | 8/2011 | Noda | 358/1.15 |
| 8,005,417 | B2 * | 8/2011 | Hattori et al. | 399/408 |
| 2003/0052441 | A1 * | 3/2003 | Nakagiri | 270/37 |
| 2004/0190057 | A1 | 9/2004 | Takahashi | |
| 2005/0044550 | A1 * | 2/2005 | Perdu | 718/105 |

FOREIGN PATENT DOCUMENTS

| | | | | | |
|---|---|---|---|---|---|
| JP | 63268678 | A | * | 11/1988 | B41J 29/42 |
| JP | 2003091380 | A | * | 3/2003 | G06F 3/12 |
| JP | 2006228017 | A | * | 8/2006 | G06F 3/12 |
| JP | 2006244088 | A | * | 9/2006 | G06F 3/12 |
| JP | 2006301741 | A | * | 11/2006 | G06F 3/12 |
| JP | 2006338096 | A | * | 12/2006 | G06F 3/12 |

OTHER PUBLICATIONS

Machime Translation of JP 2006338096 A, JPO, Sep. 29, 2011.*

* cited by examiner

*Primary Examiner* — Matthew G Marini
*Assistant Examiner* — Nguyen Ha
(74) *Attorney, Agent, or Firm* — Canon USA, Inc., IP Division

(57) ABSTRACT

In response to a predetermined user's instruction, predetermined post-processing is separated from a job adapted to cause a predetermined post-processor to perform the predetermined post-processing together with performance of print-processing.

9 Claims, 16 Drawing Sheets

FIG. 6

902

| JOB ID (1001) | JOB TITLE (1002) | PROCESSING STATUS (1003) | STATE OF POST-PROCESSING (1004) |
|---|---|---|---|
| 001 | CATALOG A | QUEUED | SIMULTANEOUSLY PROCESSED |
| 002 | MANUAL B | QUEUED | SEPARATED |
| 003 | BROCHURE C | QUEUED | SEPARATED |
| 004 | MANUAL D | QUEUED | SIMULTANEOUSLY PROCESSED |

FIG. 7

903

| POST-PROCESSING ID (1101) | POST-PROCESSING TITLE (1102) | PROCESSING STATUS (1103) | POST-PROCESSING APPARATUS ID (1104) | SOURCE PRINT JOB (1105) |
|---|---|---|---|---|
| 001 | CASE BIND | QUEUED | 001 | 002 |
| 002 | CASE BIND | QUEUED | 002 | 003 |

FIG. 8

904

| POST-PROCESSING APPARATUS ID (1201) | APPARATUS NAME (1202) | APPARATUS TYPE (1203) | PROCESSING STATUS (1204) |
|---|---|---|---|
| 001 | CASE BINDER A | INLINE | AVAILABLE |
| 002 | CASE BINDER B | NEAR-LINE | JOB UNDER EXECUTION |
| 003 | CASE BINDER C | NEAR-LINE | AVAILABLE |
| 004 | SADDLE STITCHER D | NEAR-LINE | AVAILABLE |

FIG. 9

905

```
<FINISHING>
<FINISHING.FinishingTypeFinishingType="Bookbinding"/>
<FINISHING.ManufacturerManufacturer="ABC"/>
<FINISHING.ProductNameProductName="11ABC"/>
        <Booklet>
                <Booklet.BookletTypesBooklet.NumType="1"/>
                        <Booklet.BookletTypeBooklet.BookletTypeName="Saddle Stitch" />
                </Booklet.BookletTypes>
        </Booklet>
        <Medium>
                <Medium.TypeNumMediumType="1"/>
                        <Medium.TypeMediumTypeName"Plain"/>
                <Medium.Type>
                <Medium.WeightMediumWeightCriterion="4-6Size">
                        <Medium.WeightMediumWeight="60kg">
                </Medium.Weight>
        </Medium>
        <StapleSpaceInterval>
                <StapleSpaceInterval.AdjustAdjustable="FALSE"/>
                <StapleSpaceInterval.IntervalInterval="100mm"/>
        </StapleSpaceInterval>
</FINISHING>
```

PRINTING SYSTEM, JOB PROCESSING METHOD, STORAGE MEDIUM, AND PRINTING APPARATUS

BACKGROUND OF THE INVENTION

1. Field of the Invention

The present invention relates to a printing system, a job processing method, a storage medium, and a printing apparatus that can be adapted to process a job for performing post-processing together with print-processing.

2. Description of the Related Art

Recently, print-on-demand (POD) printing systems using electrophotographic printing apparatuses or inkjet printing apparatuses have been proposed (see U.S. Published Application US-2004-0190057). Such POD printing systems do not require paste-up processes necessary for offset printing or other complex processes.

However, more consideration may be needed for commercialization of POD printing systems.

In existing printing systems, for instance, operators may make various requests for improving the productivity of a plurality of jobs accepted by the printing systems. Specifically, separation of post-processing from a job adapted to cause a predetermined post-processor to perform the post-processing together with print-processing may be demanded.

However, such a demand does not exist in the current situation and no action is taken to meet this demand.

SUMMARY OF THE INVENTION

The present invention provides a mechanism that contributes to commercialization of product that can meet a demand for separating post-processing from a job adapted to cause a predetermined post-processor to perform the post-processing together with print-processing. Thus, the present invention contributes to the establishment of a printing environment with increased convenience and/or flexibility and/or productivity for commercialization thereof.

Other aspects and features of the present invention will become apparent from, for example, the following description of exemplary embodiments with reference to the drawings.

BRIEF DESCRIPTION OF THE DRAWINGS

The accompanying drawings, which are incorporated in and constitute a part of the specification, illustrate embodiments of the invention and, together with the description, serve to explain the principle of the invention.

FIG. 6 is a diagram illustrating an example of content of a print job table illustrated in FIG. 5.

FIG. 7 is a diagram illustrating an example of content of a post-processing table illustrated in FIG. 5.

FIG. 8 is a diagram illustrating an example of post-processing-apparatus setting information illustrated in FIG. 5.

FIG. 9 is a diagram illustrating an example of post-processing setting information illustrated in FIG. 5.

DESCRIPTION OF THE EMBODIMENTS

An embodiment of the present invention will be described in detail hereinafter with reference to the drawings.

Figure 1:
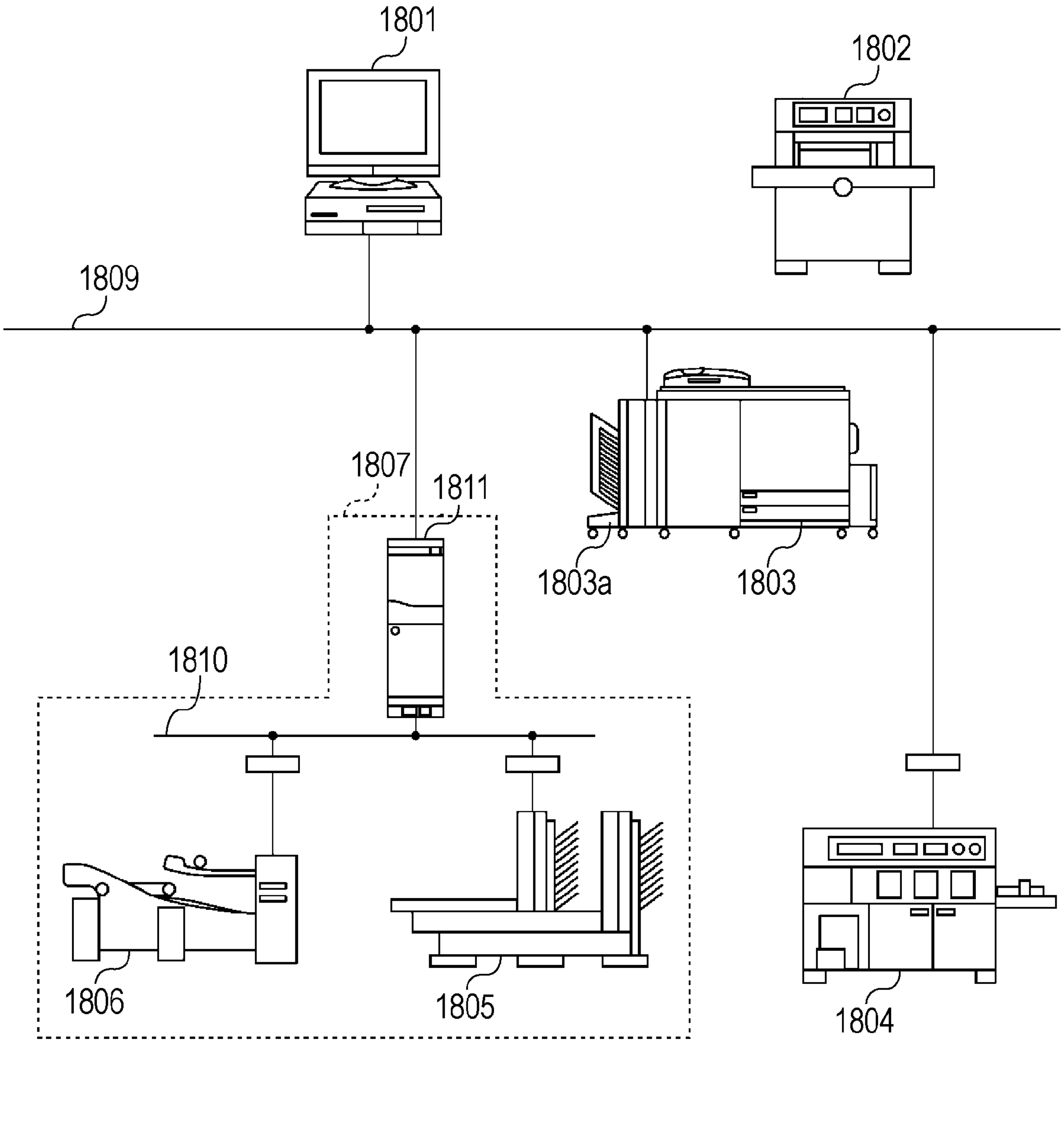
FIG. 1 is a system configuration diagram illustrating an exemplary desktop publishing (DTP) system incorporating a printing system according to an embodiment of the present invention.

FIG. 1 is a system configuration diagram illustrating an exemplary desktop publishing (DTP) system incorporating a printing system according to an embodiment of the present invention.

Referring to FIG. 1, a DTP system includes a client personal computer (PC) 1801 and a printer (printing apparatus or image forming apparatus) 1803 connected to the client PC 1801 via a network 1809. The printer 1803 is connected in-line to an inline finisher **1803*a* (a post-processing apparatus of a first type) that performs post-processing such as saddle stitching on printed sheets produced by the printer 1803. The term "connected in-line" means the state of being connected via the same path (paper path) along which printed sheets of paper are conveyed as the printer 1803**.

A near-line finisher 1804 (a post-processing apparatus of a second type) and a finisher system 1807 are also connected to the network 1809. The network 1809 may be an Internet Protocol (IP) network, and devices connected to the network 1809 support the IP protocol. Devices connected to the network 1809 are configured to communicate with one another.

The DTP system further includes an offline finisher 1802 (a post-processing apparatus of the second type) that is not connected to the network 1809.

The finisher system 1807 includes two near-line finishers 1805 and 1806, a controller 1811, and a network (or dedicated line) 1810 configured to connect the near-line finishers 1805 and 1806 and the controller 1811. A finisher connected to the network 1810 through the controller 1811 is also referred to as a near-line finisher. In FIG. 1, the two near-line finishers 1805 and 1806 are connected to the network 1810. The number of near-line finishers is not limited to two, and may be one or more than two. Devices connected to the network 1810 are configured to communicate with one another.

The printer 1803 may be a multifunction printer (MFP) having a plurality of functions such as a printing function, a scanning function, a copying function, a facsimile transmission function, and a filing function. Alternatively, the printer 1803 may be a printer having only a printing function. The client PC 1801 is formed of an information processing apparatus or a printing control apparatus having a function of controlling a printer.

The inline finishers, offline finishers, and near-line finishers will now be described in the context of a finisher control method.

An inline finisher is a post-processing apparatus that is not capable of, by itself, communicating with a host computer (for example, the client PC 1801) and that is connected to the host computer via, for example, the same sheet conveying path as a printer. A processing service to be performed by the finisher on printed sheets conveyed from the printer (for example, a binding process) is set at the printer. What processing service is to be performed is determined on the basis of post-processing setting information.

Alternatively, an inline finisher may be configured as an optional device of the printer by using a printer driver running on an information processing apparatus such as the client PC 1801. Thus, a print job (a predetermined print job) in which a processing service to be performed in the inline finisher is specified can be generated.

An offline finisher does not include a communication unit that communicates with an external apparatus (offline state). A processing service to be performed in the finisher is set at the finisher. For instance, a user (or an operator) may set a processing service through an operation unit of the offline finisher, or a processing service may automatically be set by reading printed information such as a barcode printed on a sheet to be subjected to post-processing.

A near-line finisher includes a communication unit that communicates with an external apparatus, and is configured such that a processing service to be performed in the finisher can be input through an operation unit of the finisher and can also be input as a job ticket from another device, for example, a host computer, via a network.

Features of the inline finishers, offline finishers, and near-line finishers will now be described in the context of a path along which printed sheets are conveyed. In the following description, general features thereof are described for easier understanding, which are not intended to limit the present invention.

An inline finisher is physically connected to a printer, and printed sheets output from the printer are quickly fed to the finisher through a conveying path. An offline finisher is not physically connected to a printer, and printed sheets output from the printer are temporarily stored in a wagon, a tray, a belt conveyor, or the like and are then placed in an inputting unit of the finisher.

A near-line finisher is configured such that printed sheets are temporarily stored and are then placed in an inputting unit of the finisher in a manner similar to that of an offline finisher. As described above, a processing service (job ticket) to be performed in the near-line finisher may be input through the communication unit. A near-line finisher may be implemented by an inline finisher including a communication unit configured to communicate with an external device such as a host computer so that a post-processing instruction can be entered as a job ticket through the communication unit.

Figure 2:
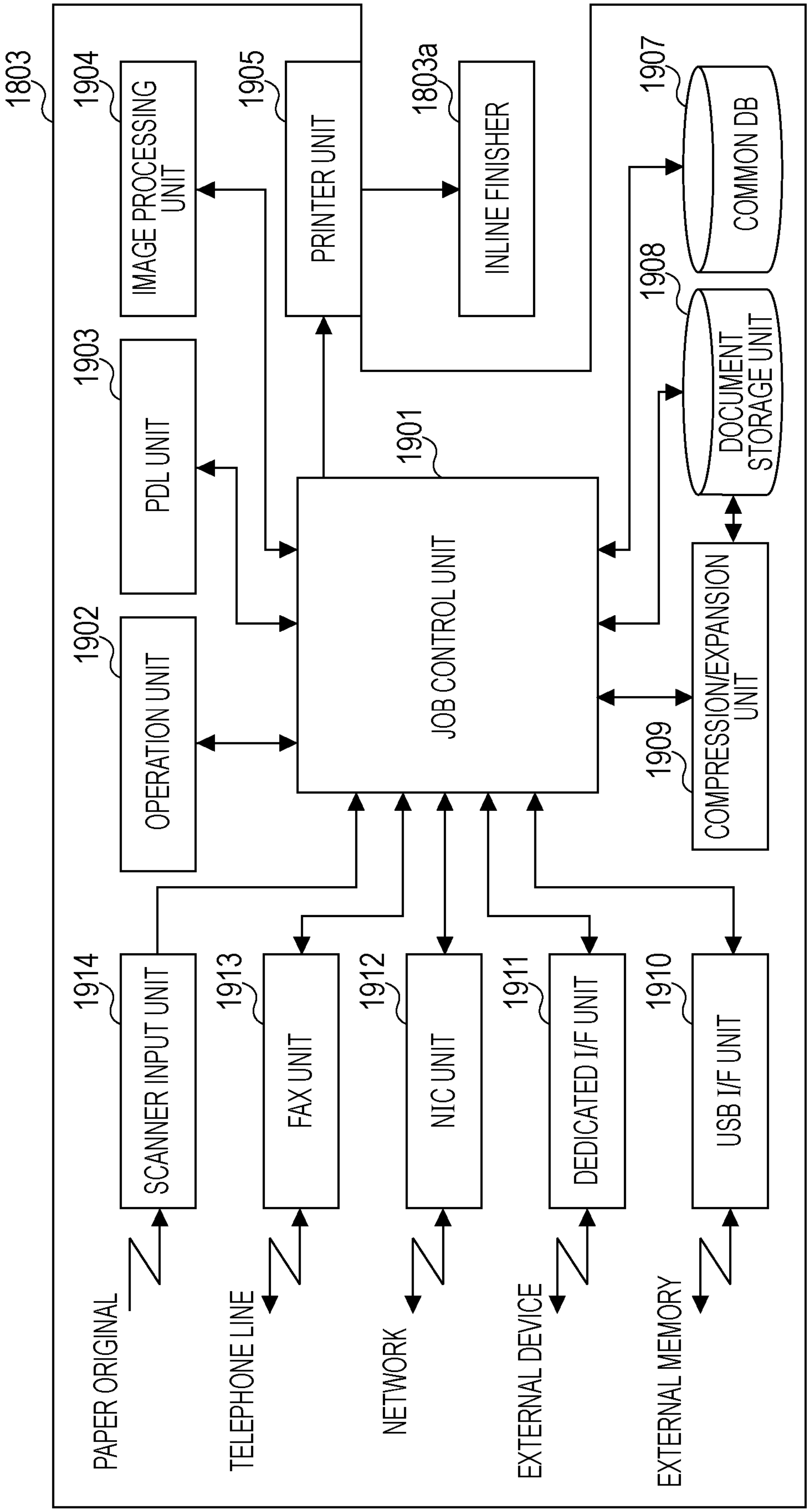
FIG. 2 is a block diagram illustrating a structure of a printer illustrated in FIG. 1.

FIG. 2 is a block diagram illustrating a structure of the printer 1803 illustrated in FIG. 1.

As illustrated in FIG. 2, the printer 1803 includes a scanner input unit 1914 including a scanner unit that reads an image and a scanner IP unit that performs image processing on image data, and a facsimile (FAX) unit 1913 that transmits and receives an image using a telephone line such as a facsimile line. The printer 1803 further includes a network interface card (NIC) unit 1912 through which image data or device information is exchanged with a computer or any other suitable device using a network. The printer 1803 further includes a dedicated interface (I/F) unit 1911 that exchanges information with an external device such as another printer. The printer 1803 further includes a universal serial bus (USB) I/F unit 1910 that interfaces with a source of transmitting print data such as a computer.

A job control unit 1901 includes, for example, a processor, a random access memory (RAM), and a hard disk, each of which is not illustrated, and executes a predetermined program by using the processor. The job control unit 1901 performs control to temporarily store an image signal or to determine a path according to the use of the printer 1803.

The job control unit 1901 can process image data from the scanner input unit 1914, image data of a facsimile job input through the FAX unit 1913, and image data input from an external apparatus such as a computer through the NIC unit 1912. The job control unit 1901 can also process image data input from another printer through the dedicated I/F unit 1911. The image data is temporarily stored in, for example, the hard disk, and is then read and transferred to a printer unit 1905 or the like. The image data transferred to the printer unit 1905 is subjected to print-processing (or is printed).

The image data includes bitmap data and data written so that an image can be drawn. For example, when page description language (PDL) data is received as image data, the PDL data is converted into data in a printable format by a PDL unit 1903, which is then subjected to appropriate image processing by an image processing unit 1904. The resulting data is printed by the printer unit 1905.

An operation unit 1902 includes operation keys and buttons, and a liquid crystal display (LCD) serving as a display unit, each of which is not illustrated, and is configured to accept an instruction given from a user or to show a list of stored print jobs. Print jobs stored in the printer 1803 include print jobs generated by the client PC 1801 and received via the network 1809, and print jobs specified by instructions given through the operation unit 1902.

The job control unit 1901 performs control so that image data read from the hard disk can be transferred to an external apparatus such as a computer or another printer according to a user's instruction accepted through the operation unit 1902. The job control unit 1901 can also store documents compressed by a compression/expansion unit 1909 in a document storage unit 1908 and can manage the documents.

The user can use the operation unit 1902 to perform the setting of an available finisher. Examples of available finishers include the inline finisher 1803*a* connected in-line to the printer unit 1905 and the near-line finisher 1804 connected through the NIC unit 1912. A common database (DB) 1907 stores post-processing setting information, which will be described below.

Figure 3A:
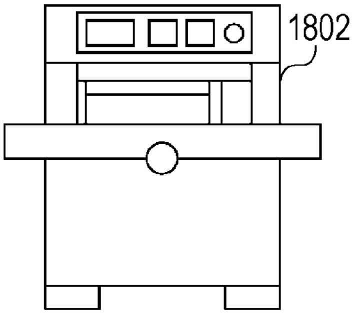
FIG. 3A is an external view of a paper cutter, which is an example of a near-line finisher.
Figure 3B:
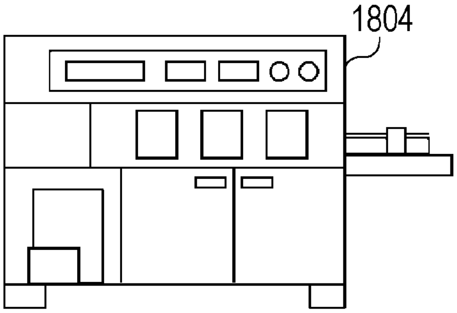
FIG. 3B is an external view of a case binder, which is an example of an offline finisher.

A variety of finishers having different functions are available. In the present embodiment, the inline finisher 1803*a* and the near-line finisher 1805 are implemented by saddle stitchers having a saddle stitching function. As illustrated in FIG. 3A, the offline finisher 1802 is implemented by a paper cutter having a paper cutting function. As illustrated in FIG. 3B, the near-line finisher 1804 is implemented by a case binder. The near-line finisher 1806 is implemented by a paper folder.

Figure 4:
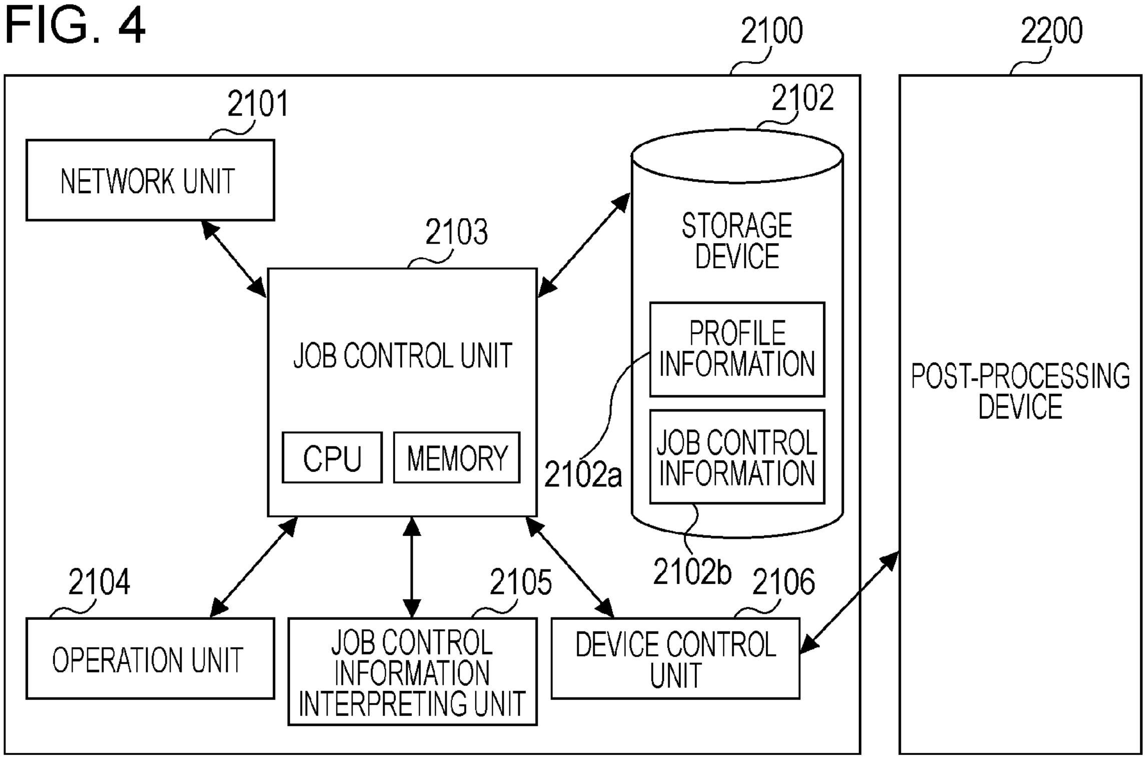
FIG. 4 is a block diagram illustrating a structure of functional components in a near-line finisher.

FIG. 4 is a block diagram illustrating a structure of functional components in the near-line finishers 1804, 1805, and 1806. In FIG. 4, an example structure of only components common to the near-line finishers 1804, 1805, and 1806 is illustrated.

A near-line finisher includes a post-processing device 2200 that executes post-processing such as saddle stitching, case binding, paper folding, and stapling on printed sheets, and a controller 2100 that controls the post-processing device 2200.

The controller 2100 includes a processor that has a control program executing function and a peripheral device control function and that controls the overall operation of the finisher, a system bus through which the components within the controller 2100 are connected, and a read-only memory (ROM) that stores a control program executed by the processor and various data. The controller 2100 further includes a RAM that stores job tickets and other data.

In the present embodiment, the controller 2100 includes a network unit 2101, a storage device 2102, a job control unit 2103, an operation unit 2104, a job control information interpreting unit 2105, and a device control unit 2106.

The network unit 2101 communicates with other network devices such as an external host computer and an MFP, and receives a job ticket (hereinafter also referred to as "job control information") in which a post-processing instruction is defined. The storage device 2102 is a primary storage device that temporarily stores information, such as a dynamic RAM (DRAM), or a secondary storage device such as a hard disk drive (HDD). The storage device 2102 includes an area 2102*a* in which profile information of the near-line finisher such as the name, type, and identification number (ID) is stored, and an area 2102*b* in which the job control information described above and other appropriate information are stored. The data stored in the areas 2102*a* and 2102*b* may be stored in a ROM (not illustrated) in the job control unit 2103. Alternatively, the data may be transferred to the printer 1803 via a network and may be read (or written in advance) by the printer 1803. This method enables various types of control, which will be described below, involved when a printed product obtained by the printer 1803 is processed using the near-line finisher or an offline finisher.

The job control unit 2103 includes a processor (a central processing unit (CPU)) that controls print jobs at the near-line finisher, and a memory. The operation unit 2104 accepts an ID entered from the user.

The job control information interpreting unit 2105 interprets input job control information and converts it into a device-controllable form. Job control information for controlling a finisher is also referred to as post-processing setting information. The device control unit 2106 controls the post-processing device 2200. The post-processing device 2200 is a processing device that performs post-processing (post-press processing), and includes, for example, a hardware component for achieving a case binding function.

Figure 5:
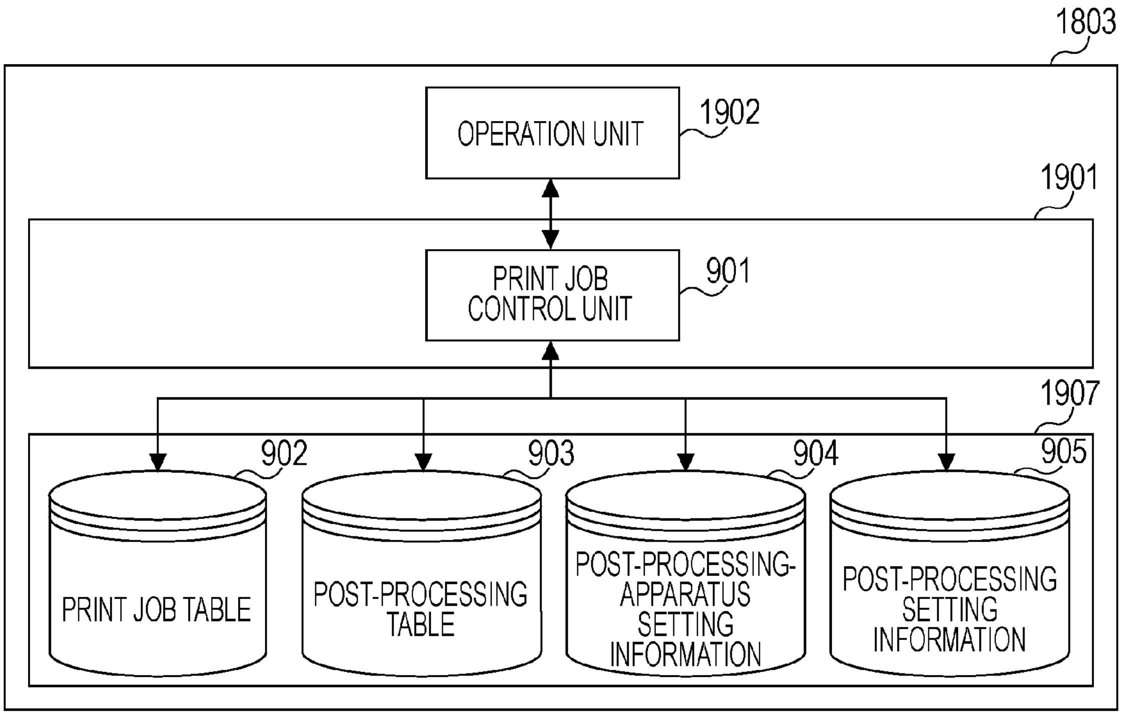
FIG. 5 is a block diagram illustrating a structure of modules involved in controlling print jobs within the printer.

FIG. 5 is a block diagram illustrating a structure of modules involved in controlling print jobs within the printer 1803.

The printer 1803 includes a print job control unit 901, a print job table 902, a post-processing table 903, post-processing-apparatus setting information 904, post-processing setting information 905, and the operation unit 1902. The print job control unit 901 constitutes a part of functions of the job control unit 1901. The print job table 902, the post-processing table 903, the post-processing-apparatus setting information 904, and the post-processing setting information 905 are included in the common database 1907.

The print job control unit 901 divides a print job (predetermined print job) specified and entered by the user through the operation unit 1902 into pre-processing (print processing) and post-processing, and extracts the post-processing from the print job for storage. The print job control unit 901 further performs processes such as selecting an apparatus to be used to execute the post-processing and storing setting information regarding the post-processing.

The print job table 902 stores information shown in FIG. 6, which will be described below. The post-processing table 903 stores information shown in FIG. 7, which will be described below. The post-processing-apparatus setting information 904 stores information shown in FIG. 8, which will be described below. The post-processing setting information 905 stores information shown in FIG. 9, which will be described below.

FIG. 6 is a diagram illustrating an example of content of the print job table 902 illustrated in FIG. 5.

The print job table 902 stores information regarding print jobs that can be processed by the printer 1803. In the present embodiment, the print job table 902 includes items relating to job ID 1001, job title 1002, processing status 1003, and state of post-processing 1004. For example, a column with job ID "002" is associated with job title "manual B", processing status "queued", and state of post-processing "separated". The term "queued" means that the process is suspended. The term "separated" means that the post-processing and the pre-processing are not performed simultaneously and that the print job is divided for processing.

FIG. 7 is a diagram showing an example of content of the post-processing table 903 illustrated in FIG. 5.

In the present embodiment, the post-processing table 903 include items relating to post-processing ID 1101, post-processing title 1102, processing status 1103, post-processing apparatus ID 1104, and source print job ID 1105. For example, a column with post-processing ID "002" is associated with post-processing title "case bind", processing status "queued", post-processing apparatus ID "002" (an apparatus assigned "002"), and source print ID "003" (a print job assigned "003"). As described previously, the term "queued" means that the process is suspended.

FIG. 8 is a diagram showing an example of content of the post-processing-apparatus setting information 904 illustrated in FIG. 5.

In the present embodiment, the post-processing-apparatus setting information 904 includes items related to post-processing apparatus ID 1201, apparatus name 1202, apparatus type 1203, and processing status 1204. For example, a column with post-processing apparatus ID "002" is associated with apparatus name "case binder B", apparatus type "near-line", and processing status "job under execution".

FIG. 9 is a diagram showing an example of content of the post-processing setting information 905 illustrated in FIG. 5. In the example shown in FIG. 9, information regarding the setting of a bookbinder is described.

In a "FINISHING" tag, "FinishingType" indicates the type of the bookbinder, "Manufacturer" indicates the name of manufacturer of the bookbinder, and "ProductName" indicates the product name of the bookbinder. In FIG. 9, a "bookbinder with product name "11ABC" manufactured by ABC Corporation (Type: Bookbinding)" is illustrated.

A "Booklet" or "Cutting" (not shown) tag is a tag describing the performance unique to the corresponding machine (bookbinder or paper cutter). For example, in the setting information of the bookbinder shown in FIG. 9, "saddle stitch" is defined as the type name in the "Booklet" tag. In a "Medium" tag, "Plain" is defined as the medium type and "60 Kg" is defined as the medium weight. In a "StapleSpaceInterval" tag, the staple space interval is not adjustable ("False") and a space interval of 100 mm is defined.

While the present embodiment provides a structure in which the printer 1803, which is a printing apparatus or an image forming apparatus, functions as a printing system, the present invention is not limited to this embodiment. For instance, an apparatus (or system) including the printer 1803 and the inline finisher 1803*a* may function as the printing system of the present embodiment. Accordingly, the printing system of the present embodiment may be configured in various ways. It is preferable that components corresponding to the mechanisms below of the printing system of the present embodiment be provided.

For instance, the printer 1803, which functions as the printing system of the present embodiment, is configured to provide a mechanism that can meet a potential demand for a predetermined post-processor capable of receiving a printed medium conveyed from a printing unit. In particular, the printer 1803 is configured to provide a mechanism that meets a demand for separating post-processing performed by the post-processor from a job for performing the post-processing together with performance of print-processing by the printing unit. It is desirable to provide a printing apparatus and/or printing system, for example, the printer 1803, which can contribute to the provision of a printing system with increased convenience and/or flexibility and/or productivity for commercialization thereof.

In the present embodiment, an exemplary structure in which the printer unit 1905 functions as the printing unit is provided. In this exemplary structure, the inline finisher 1803*a* functions as the predetermined post-processor including a printed medium accepting unit configured to accept a printed medium conveyed from the printing unit. The term "post-processing" refers to a finishing process (modifying process) to be executed on a printed product (for example, various printed media such as printed sheets) that has been subjected to print-processing by the printer unit 1905. Specific examples of the post-processing include various finishing processes supported by the printing system of the present embodiment, such as stapling, punching, cutting, saddle stitching, case binding, and glue binding. These examples are merely illustrative and are not intended to limit the present invention.

The printing system of the present embodiment includes the following elements in order to achieve the advantages described above.

For instance, the printer 1803 corresponding to the printing system includes a job accepting unit configured to accept a print job to be subjected to post-processing by the inline finisher 1803*a* together with performance of print-processing by the printer unit 1905. In the present embodiment, units configured to receive print data to be printed, such as the scanner input unit 1914, the FAX unit 1913, the NIC unit 1912, the dedicated I/F unit 1911, and the USB I/F unit 1910, function as the job accepting unit, by way of example. The job accepting unit is also implemented by a user interface used by a user to enter various commands related to a job to be processed, such as the operation unit 1902 and a monitor and pointing device of the client PC 1801. Those examples are also illustrative and are not intended to limit the present invention. It is desirable that, like the printer 1803, the printing system includes a job accepting unit configured to accept a print job to be subjected to post-processing by the inline finisher (corresponding to the predetermined post-processor) 1803*a* together with performance of print-processing by the printer unit 1905.

The printer 1803 includes an instruction accepting unit configured to accept through a user interface a post-processing separating instruction for separating the post-processing from the print job accepted by the job accepting unit. In the present embodiment, the job control unit 1901 functions as the instruction accepting unit, by way of example. The instruction accepting unit is also implemented by a user interface used by a user to enter various commands related to a job to be processed, such as the operation unit 1902 and a monitor and pointing device of the client PC 1801. Those examples are also illustrative and are not intended to limit the present invention.

In a specific example described below, the phrase "division of a print job" is used instead of the phrase "separation of post-processing from a print job". In the specific example described below, the phrase "division of a print job into pre-processing (corresponding to print-processing) and post-processing (corresponding to finishing processing)" is also used. Such phrases have the same meaning although different phrases are used for easier understanding of the mechanism of the printing system of the present embodiment.

In the present embodiment, furthermore, the printer 1803 which functions as the printing system includes the job control unit 1901 that functions as a job controller. The printer 1803 is therefore configured to execute the following control. For instance, in the present embodiment, it is assumed that a post-processing separating instruction regarding a print job to be subjected to the post-processing described above in association with the print-processing has not been received from the user through the user interface described above. In this case, based on a premise that the instruction has not been received, the job control unit 1901 causes the printer unit 1905 to execute the print-processing necessary for the print job and thereafter causes the inline finisher 1803*a* to execute the post-processing necessary for the job. In this case, therefore, the job control unit 1901 allows the inline finisher 1803*a* to execute post-processing in association with print-processing performed by the printer unit 1905.

On the other hand, it is assumed that a post-processing separating instruction regarding the print job described above has been received from the user through the user interface. In this case, based on a premise that the instruction has been accepted, the job control unit 1901 causes the printer unit 1905 to execute the print-processing necessary for the print job. Since the post-processing separating instruction for the job has been issued, based on the premise of giving the post-processing separating instruction, the job control unit 1901 controls the inline finisher 1803*a* not to execute post-processing together with execution of print-processing on the job. In this case, therefore, the job control unit 1901 prohibits the inline finisher 1803*a* from executing post-processing in association with print-processing performed by the printer unit 1905.

Accordingly, the job control unit 1901 that functions as an exemplary job controller executes selectively control in the manner described above according to whether or not a post-processing separating instruction can be accepted by the user interface. The job control unit 1901 that functions as a job controller also executes the following control.

For instance, it is assumed that, for a print job subjected to the post-processing described above in association with print-processing, a post-processing separating instruction has been accepted through the user interface described above. In this case, according to the instruction, the job control unit 1901 controls the printer 1803 so that the post-processing necessary for the print job can be executed using another post-processor different from the inline finisher 1803*a* without causing the inline finisher 1803*a* to execute the post-processing.

In the present embodiment, the different post-processor may be implemented by, for example, the near-line finisher 1804, 1805, or 1806, or the offline finisher 1802. The printing system of the present embodiment is therefore configured such that this post-processor can be implemented by a post-processor which does not include the printed medium accepting unit described above. In the present embodiment, as a specific example of this mechanism, the printer 1803 includes the following mechanism.

As described above, in the present embodiment, the near-line finishers 1804, 1805, and 1806 exist as post-processors of a type different from that of the inline finisher 1803*a*. Each near-line finisher includes a receiving unit (for example, the network unit 2101 illustrated in FIG. 4) that receives, via a network (for example, the network 1809 illustrated in FIG. 1), information regarding post-processing necessary for a print job for which a post-processing separating instruction as described above has been issued. With the use of this mechanism, in the present embodiment, upon accepting the post-processing separating instruction, the job control unit 1901 performs control to transmit the information to the near-line finisher from the printer 1803 via the network.

During the transmission of the data, in the present embodiment, the NIC unit 1912 illustrated in FIG. 2 or the like, which functions as a transmitting unit provided in the printer 1803, is controlled. As another specific example, the printer 1803 has the following mechanism. For instance, as described above, the offline finisher 1802 exists as a post-processor of a type different from that of the inline finisher 1803*a*. Such an offline finisher does not include a receiving unit (for example, the network unit 2101 illustrated in FIG. 4) having the function described above, which is provided in a near-line finisher. In the present embodiment, the printer 1803 is configured to also support such an offline finisher.

It is assumed that the job control unit 1901 has accepted a post-processing separating instruction for the print job described above from the user through the user interface. In this case, in order to support such an offline finisher used in the present embodiment, on the basis of the instruction, the job control unit 1901 performs control so that the printer unit 1905 can create an instruction sheet in which information regarding the post-processing necessary for the print job is described. Specific examples of the information may include information that allows a user to visually identify under what post-processing conditions what type of post-processing is to be executed on a printed product of what kind of print job. A sheet printed with the information is used as the instruction sheet.

Accordingly, the printer 1803, which functions as a printing system, may have various mechanisms. In the present embodiment, the printer 1803 may further has a mechanism as follows.

For instance, the printer 1803 of the present embodiment can use the job accepting unit described above, which includes the scanner input unit 1914 and the NIC unit 1912, to sequentially accept a plurality of print jobs to be subjected to print-processing by the printer unit 1905. With the use of this mechanism, in the present embodiment, the job control unit 1901, which also functions as the instruction accepting unit described above, also executes various types of operation control on the user interface described above.

For instance, for a print job for which the post-processing separating instruction described above is allowed to execute among the plurality of print jobs, the job control unit 1901 performs control so that the post-processing separating instruction described above can be executed by the user through the user interface. For a print job for which the post-processing separating instruction described above is not allowed to execute among the plurality of print jobs, on the other hand, the job control unit 1901 performs control so that the post-processing separating instruction cannot be executed by the user through the user interface. Accordingly, the job control unit 1901 restricts each job to be printed by the printer unit 1905 in terms of whether the acceptance of a post-processing separating instruction is allowed or prohibited. The printer 1803 further has a mechanism as below in association with this mechanism.

For instance, the job control unit 1901 performs control so that a post-processing combining instruction for causing the inline finisher 1803*a* to execute post-processing even on a print job for which a post-processing separating instruction has been issued in the manner described above can be accepted through the user interface. It is assumed that a post-processing combining instruction for a print job from which post-processing has been separated has been accepted. In response to the instruction, the job control unit 1901 performs control so that the inline finisher 1803*a* performs post-processing on this print job in after the execution of print-processing by the printer unit 1905 without completing the processing of the print job at the time of the execution of the print-processing. In this case, therefore, based on the premise of acceptance of a post-processing combining instruction, the job control unit 1901 allows the inline finisher 1803*a* to perform post-processing even on a print job for which a post-processing separating instruction has been issued in the manner described above in association with print-processing performed by the printer unit 1905.

A print job for which a post-processing combining instruction is to be issued may not necessarily be a print job for which a post-processing separating instruction has been issued in the manner described above. Examples of the print job for which a post-processing combining instruction is to be issued include a print job that requires only print-processing but does not require post-processing such as glue binding or stapling performed by the inline finisher 1803*a*. The job control unit 1901 performs control so that in a case where such a print job has been accepted by the job accepting unit described above, the user can perform a post-processing combining instruction on the job through the user interface. Accordingly, the printing system of the present embodiment is configured such that even a print job for which a post-processing separating instruction has not been issued can be handled as a print job for which a post-processing combining instruction is to be issued.

In the present embodiment, the printer 1803 further has a mechanism as below using the mechanism described above. For instance, the job control unit 1901 may also function as a management unit that manages information regarding a plurality of print jobs held in a print queue for which the printer unit 1905 has not completed the print-processing in association with print data of the jobs stored in the memory of the document storage unit 1908 or the like. The job control unit 1901 further performs control so that the user is notified of the information through the user interface described above or the like.

Figure 16:
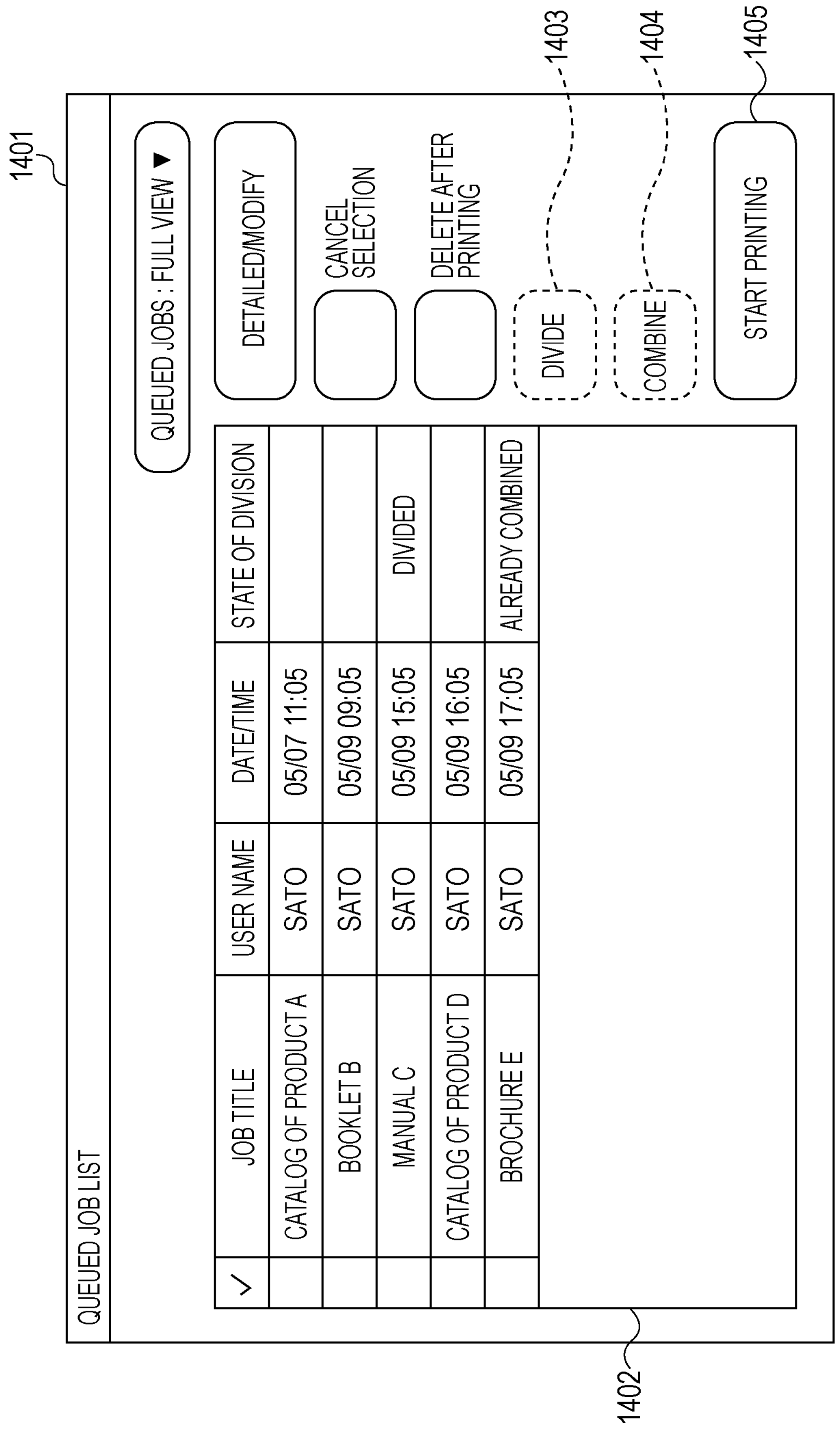
FIG. 16 is a diagram illustrating an example of the "queued job list" screen which is displayed after the combining process has been performed for the divided print job.

As an example, in the present embodiment, the job control unit 1901 performs control so that the user is notified, through the user interface described above, of identification information for allowing the user to specify a print job for which a post-processing separating instruction has been accepted in the manner described above. The job control unit 1901 also performs control so that the user is notified, through the user interface described above, of identification information for allowing the user to specify a print job for which a post-processing combining instruction has been accepted in the manner described above. In this case, the job control unit 1901 causes the user interface to display these pieces of identification information in such a manner that the user can distinguish them from each other. A specific example of this mechanism is illustrated in FIG. 16, which will be described below. However, this mechanism is not intended to limit the present invention, and the user may be notified of one of these pieces of identification information.

Accordingly, with the use of the various mechanisms described above, the printing system of the present embodiment can achieve the advantage of providing mechanisms that meet various demands involved with an inline finisher. For instance, as described above, the printing system of the present embodiment is configured to provide a mechanism that meets a demand for separating post-processing performed by the inline finisher 1803*a* from a job on which the post-processing is to be performed after the performance of print-processing by the printer unit 1905. Therefore, the printing system of the present embodiment can contribute to the provision of a printing environment with increased convenience and/or flexibility and/or productivity for commercialization thereof.

The present embodiment may provide a printing apparatus and/or a post-processing apparatus and/or a printing system having a structure corresponding to at least one of the various components relating to the control performed by the predetermined post-processor described above in the present embodiment. These apparatuses and system may fall within the scope of the present invention.

In the present embodiment, furthermore, as described above, the job control unit 1901 functions as a unit configured to perform various types of determination and/or control corresponding to the components described above, by way of example. However, the present embodiment may provide other structures. For instance, all or part of the various types of determination and/or control described above, which are executed by the job control unit 1901 or executed in cooperation with the job control unit 1901, may be performed by another unit. Thus, the present invention can be applied to either a structure in which, for example, an apparatus and/or a system is controlled by a single CPU or a structure in which an apparatus and/or a system is controlled in cooperation of a plurality of CPUs.

Specific examples of control regarding various components of the predetermined post-processor described above in the present embodiment will be described in turn. Components other than the components described in the following specific examples are the same as or similar to those described above, and will not be described. The structure described in the following specific examples is illustrative and is not intended to limit the present invention.

In the following specific examples, the job control unit 1901 performs control so that various user interface screens illustrated in FIGS. 10 to 16 are displayed on the operation unit 1902, which functions as an example of the user interface described above, by way of example. This structure is not intended to limit the present invention. For instance, as described above, a screen equivalent to those screens may be provided by using a user interface of an external apparatus such as the client PC 1801.

Figure 17:
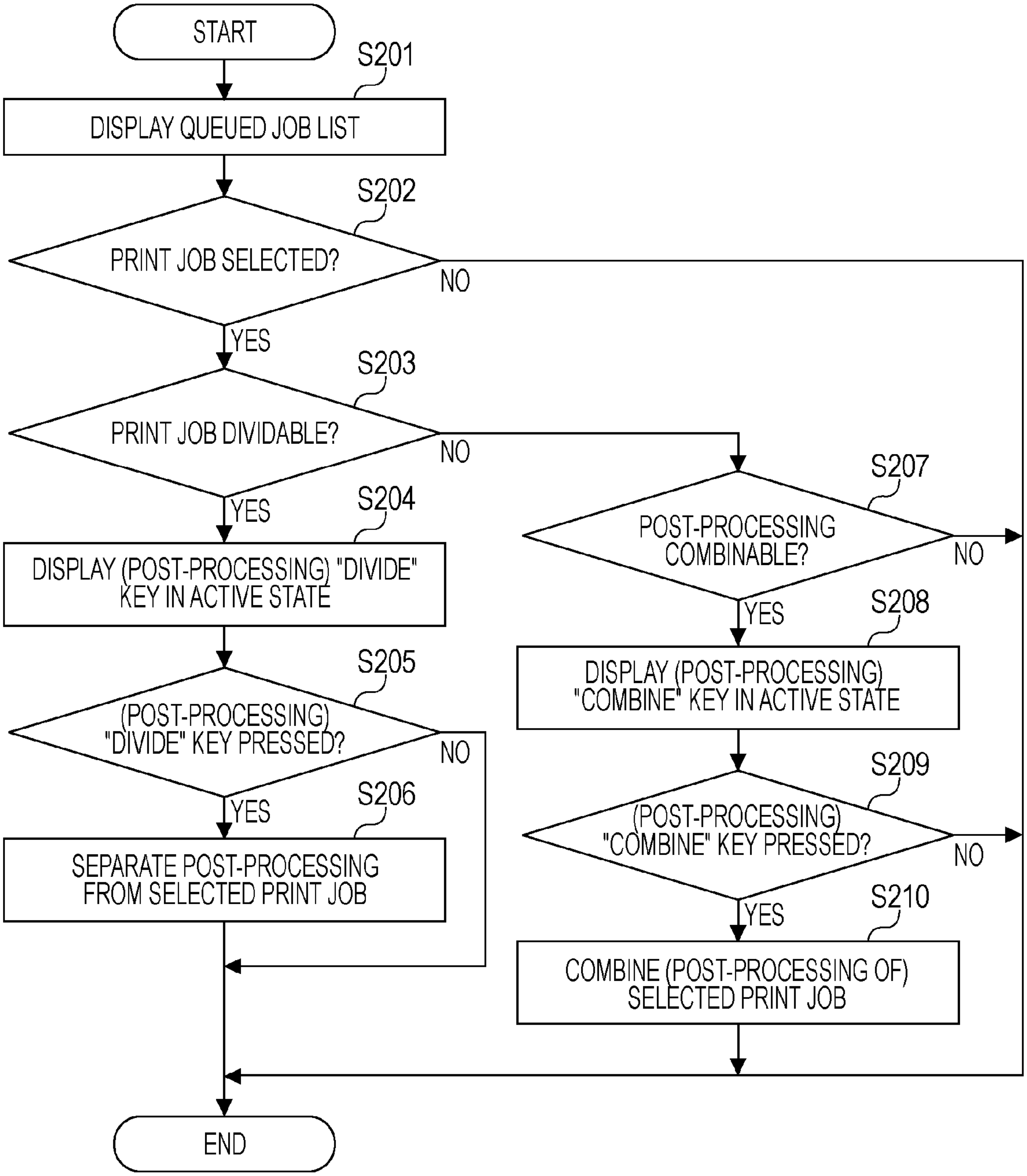
FIG. 17 is a flowchart illustrating a process of dividing a print job or performing a combining process for a print job.
Figure 18:
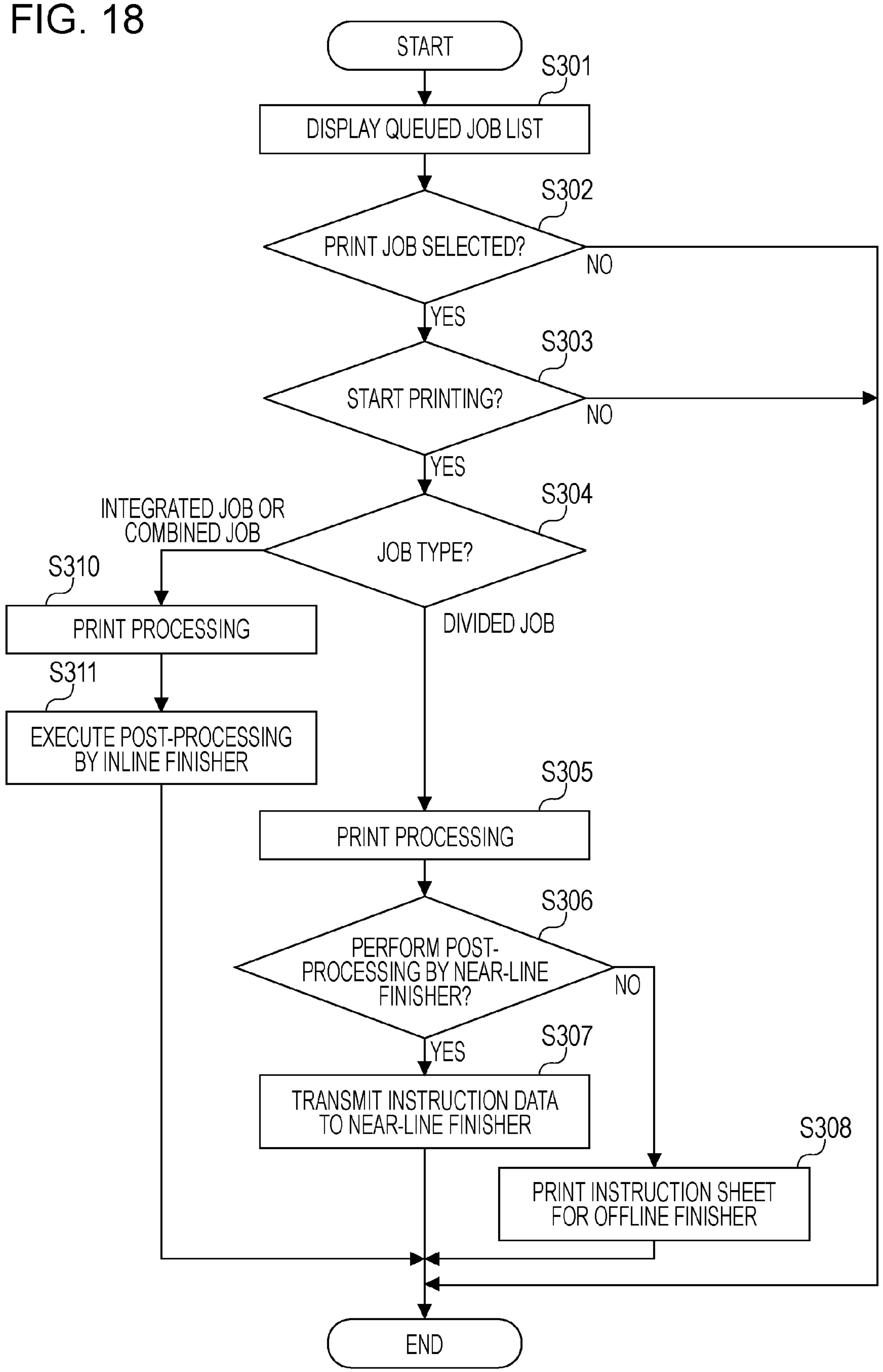
FIG. 18 is a flowchart illustrating a process of selecting a finisher to be used to execute post-processing.

A computer-readable program for executing processes illustrated in flowcharts of FIGS. 17 and 18 is read by the CPU of the job control unit 1901 from an internal memory of the printer 1803 and is executed. The processes are thereby carried out. This structure is illustrative and is not intended to limit the present invention. For instance, as described above, the processes may be carried out by a CPU of an external apparatus such as the client PC 1801.

First, a screen displayed on the operation unit 1902 of the printer 1803 will be described with reference to FIGS. 10 to 16. The screen displayed on the operation unit 1902 is a touch panel screen and the user touches a touch panel key on the screen to execute a function associated therewith.

Next, a sequence of screens displayed on the operation unit 1902 when a print job is divided into pre-processing (corresponding to print-processing) and post-processing (corresponding to finishing processing) will be described with reference to FIGS. 10 to 13.

Figure 10:
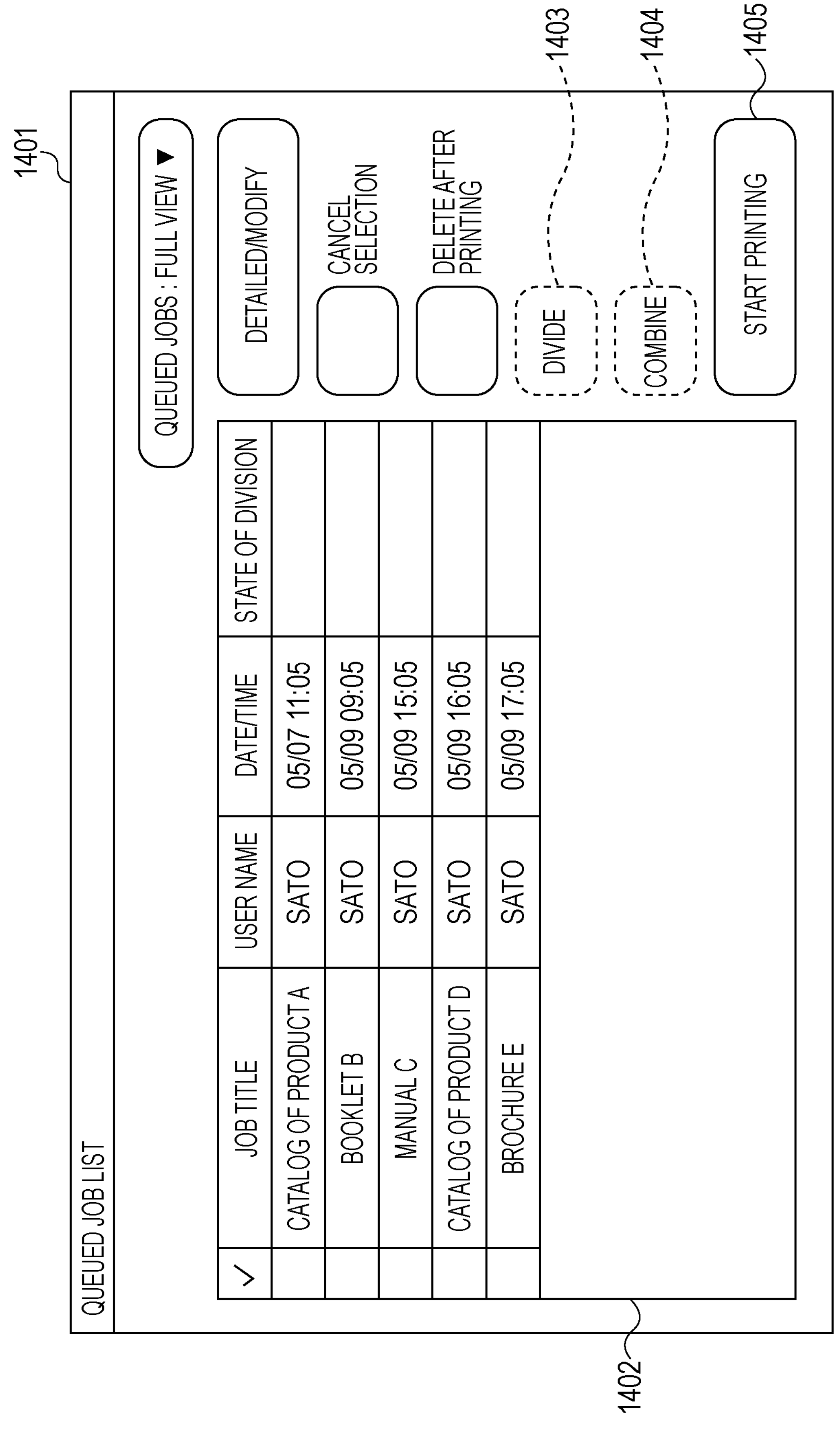
FIG. 10 is a diagram illustrating an exemplary "queued job list" screen on which print jobs stored in the printer are shown.

FIG. 10 is a diagram illustrating an exemplary "queued job list" screen 1401 on which print jobs stored in the printer 1803 are shown.

A list 1402 on the "queued job list" screen 1401 shows items set in the print jobs. In the example illustrated in FIG. 10, the items include, but are not limited to, a job title, a user name, a date/time, and a state of division.

A "divide" key 1403 is used by the user to divide a print job selected on the list 1402. A "combine" key 1404 is used by the user to combine pre-processing and post-processing into which a print job selected on the list 1402 has been divided. A "start printing" key 1405 is used by the user to print a selected print job.

Figure 11:
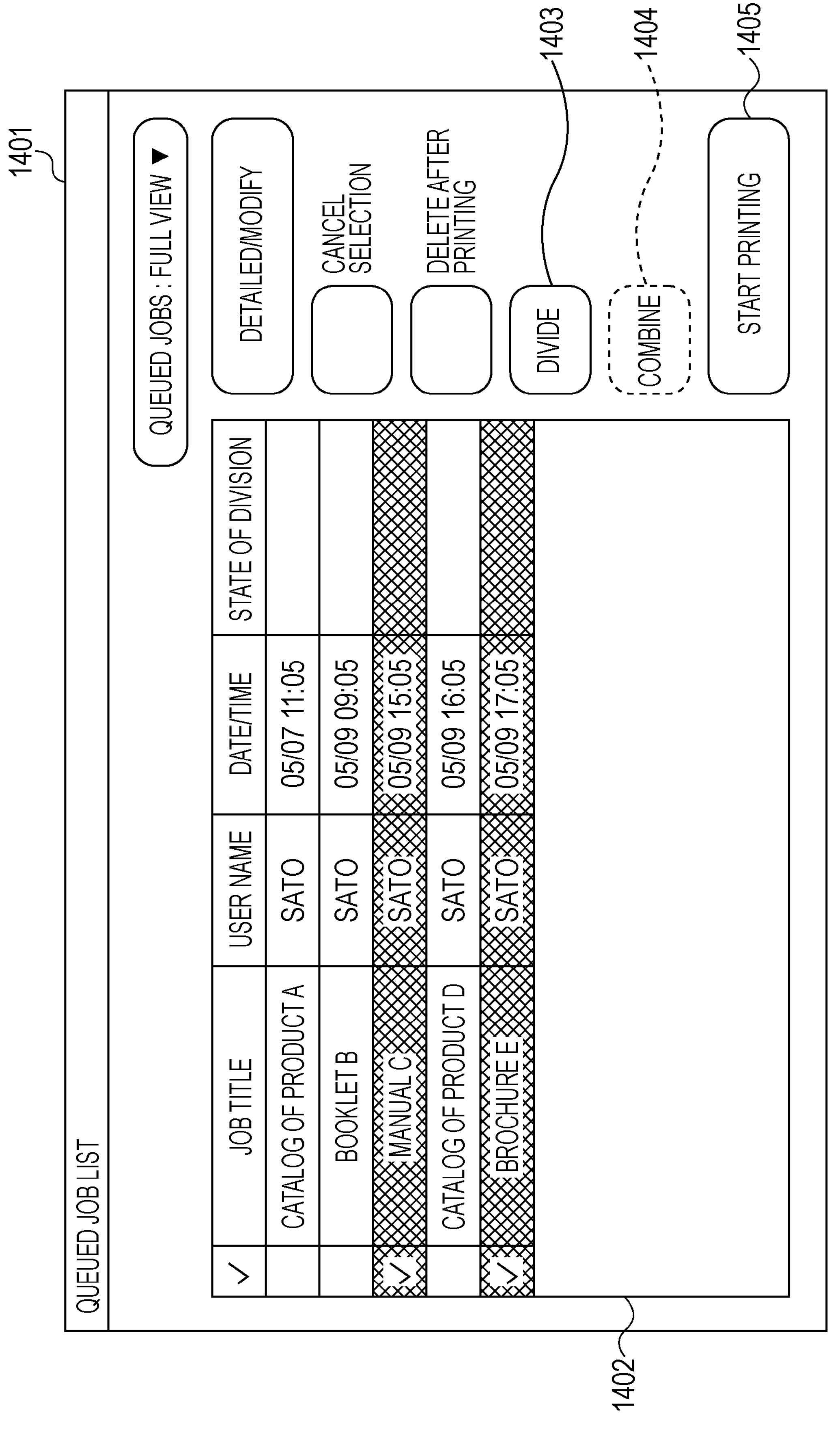
FIG. 11 is a diagram illustrating an example of the "queued job list" screen which is displayed when a print job selected by a user is to be divided.
Figure 12:
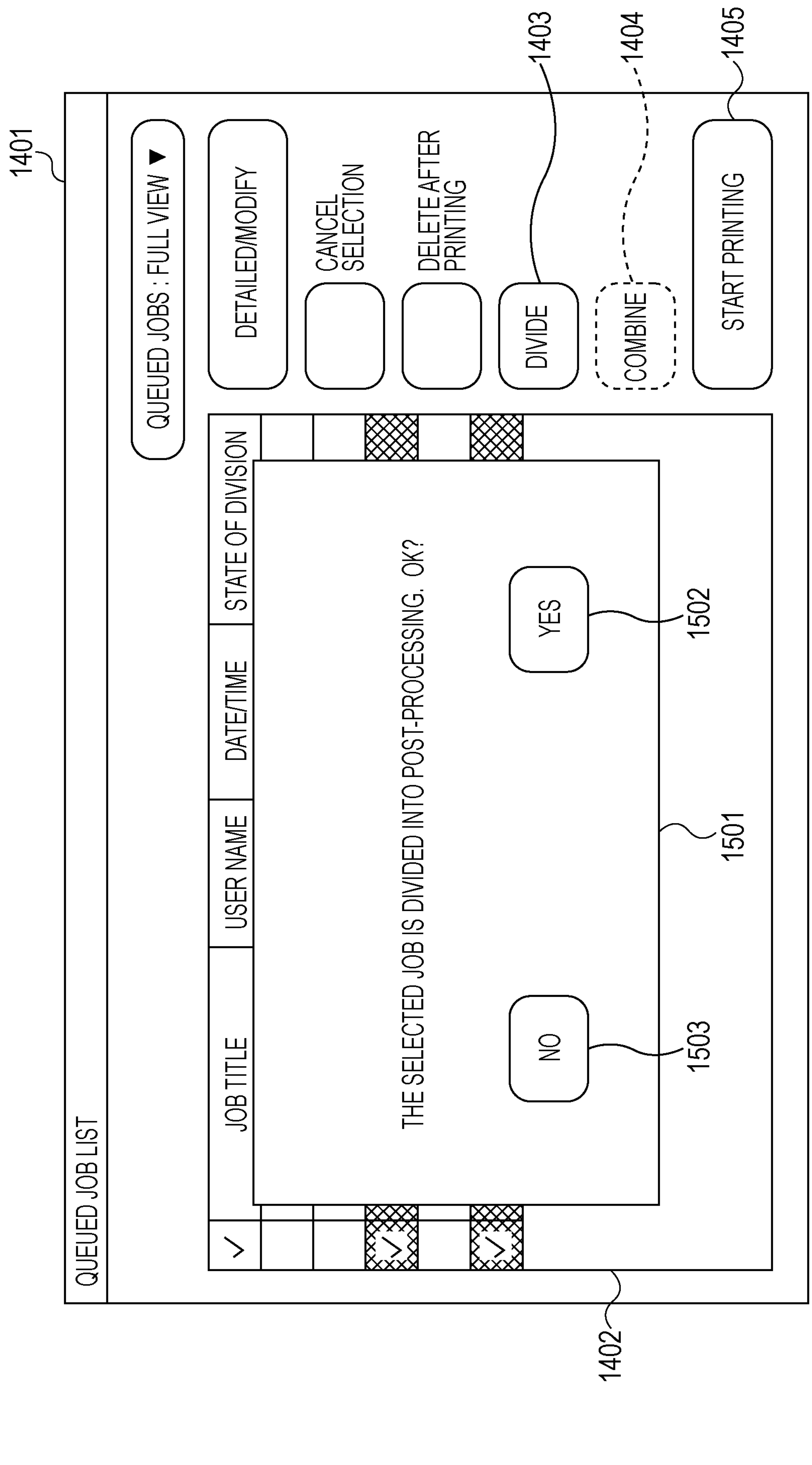
FIG. 12 is a diagram illustrating an exemplary screen on which a dialog for confirming whether a selected print job is to be divided is shown.
Figure 13:
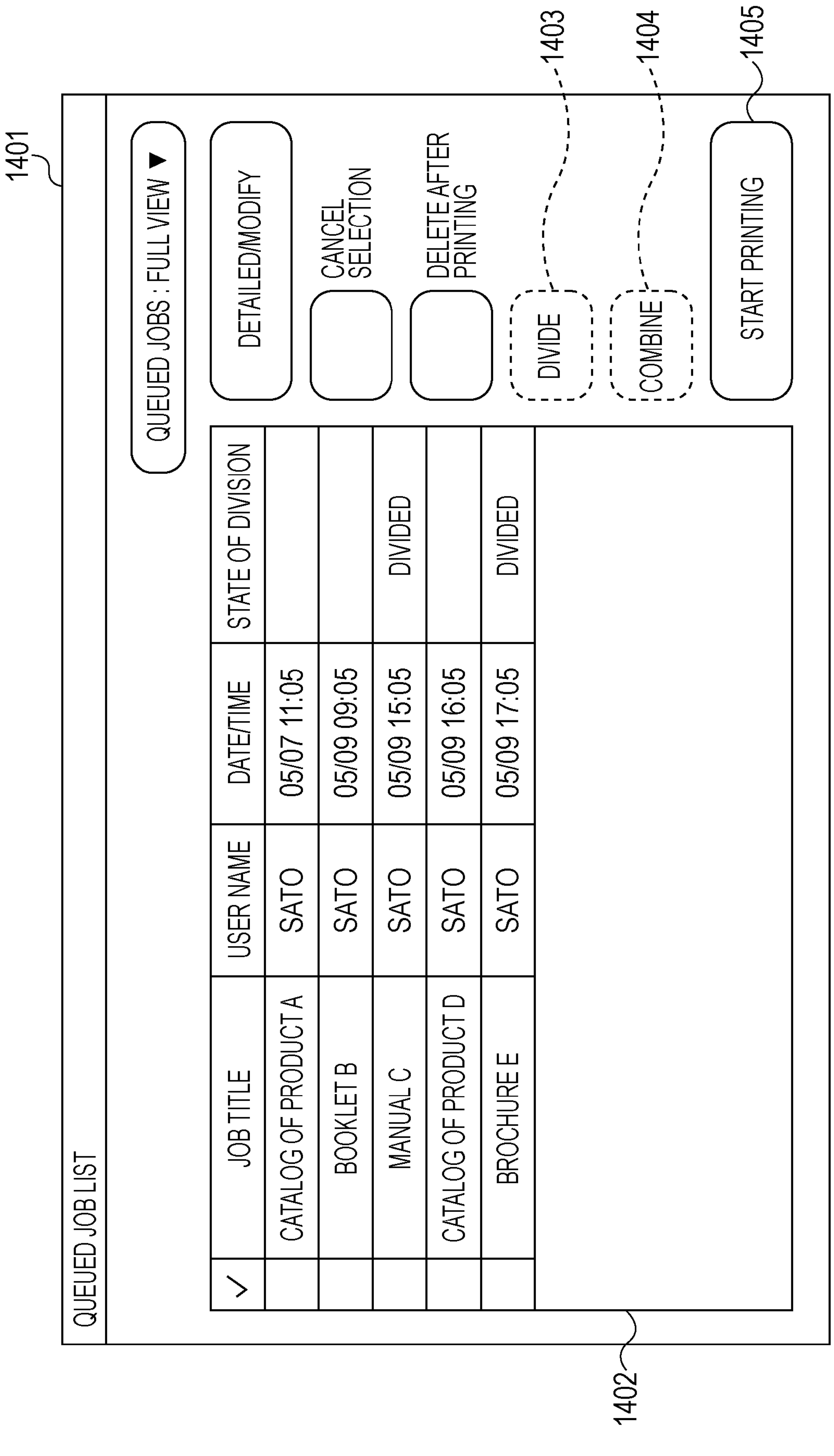
FIG. 13 is a diagram illustrating an example of the "queued job list" screen which is displayed after the print job has been divided.

FIG. 11 is a diagram illustrating an example of the "queued job list" screen 1401 which is displayed when a print job selected by the user is to be divided. FIG. 12 is a diagram illustrating an exemplary screen on which a dialog for confirming whether a selected print job is to be divided is shown. FIG. 13 is a diagram illustrating an example of the "queued job list" screen 1401 which is displayed after the print job has been divided.

As illustrated in FIG. 11, the user selects a print job to be divided into pre-processing and post-processing from the list 1402 on the "queued job list" screen 1401. In the example illustrated in FIG. 11, print jobs with job titles "Manual C" and "Brochure E" are currently selected. If the user selects a print job that can be divided, the "divide" key 1403 is displayed in an active state to allow the pressing of the key 1403. When the user presses the "divide" key 1403 displayed in the active state, as illustrated in FIG. 12, a division confirmation dialog 1501 for confirming whether the print job is to be divided is shown on the "queued job list" screen 1401.

The division confirmation dialog 1501 has a "YES" key 1502 and a "NO" key 1503. When the "YES" key 1502 is pressed, a process of dividing the currently selected print job into pre-processing and post-processing is executed. When the "NO" key 1503 is pressed, on the other hand, the division confirmation dialog 1501 is closed and the "queued job list" screen 1401 appears. When the process of dividing the print jobs is executed, as illustrated in FIG. 13, the phrase "divided" is shown in the state-of-division column of the print jobs with job titles "Manual C" and "Brochure E".

Next, a sequence of screens displayed on the operation unit 1902 when a combining process is performed for a divided print job will be described with reference to FIGS. 14 to 16.

Figure 14:
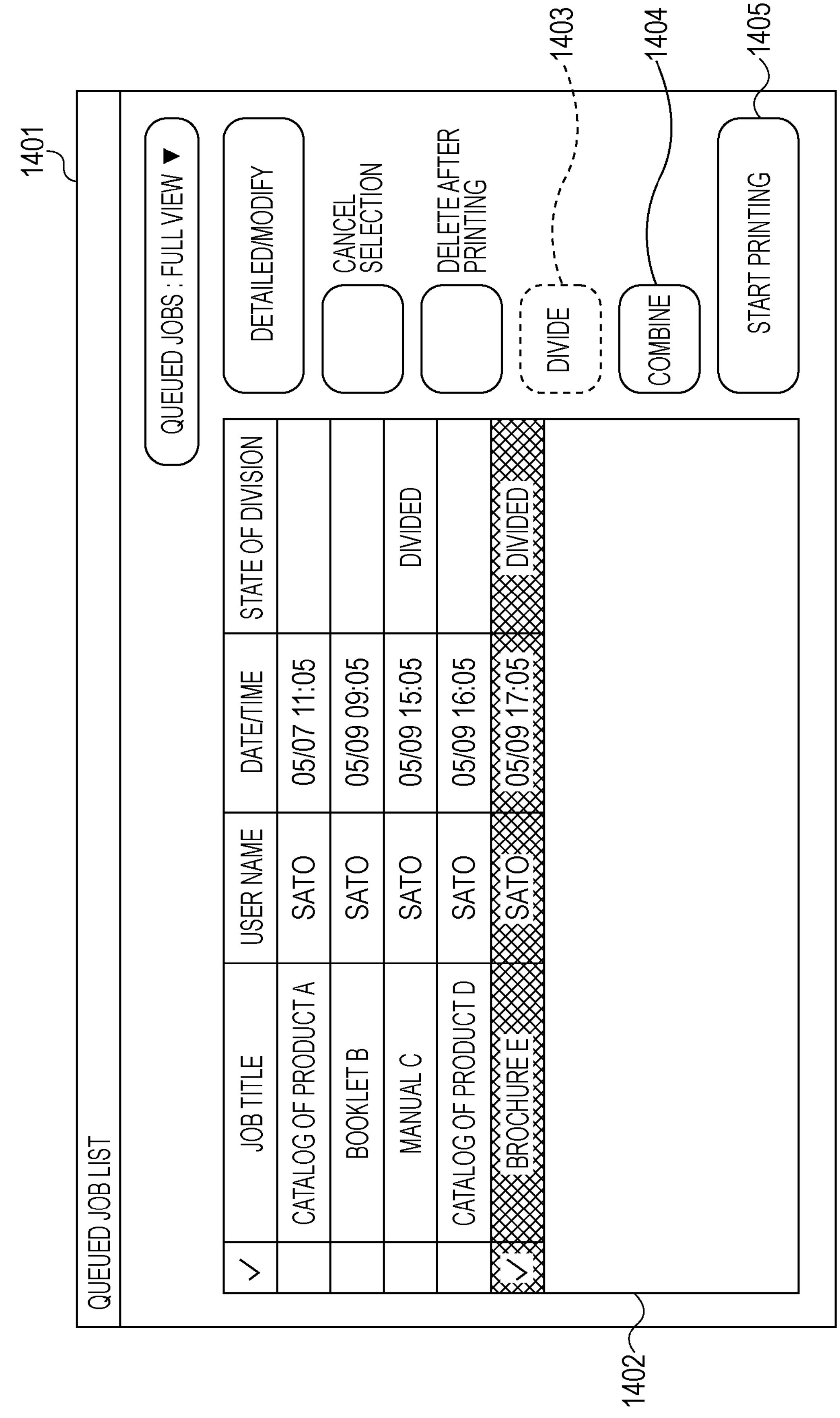
FIG. 14 is a diagram illustrating an example of the "queued job list" screen which is displayed when a combining process is performed for a divided print job.
Figure 15:
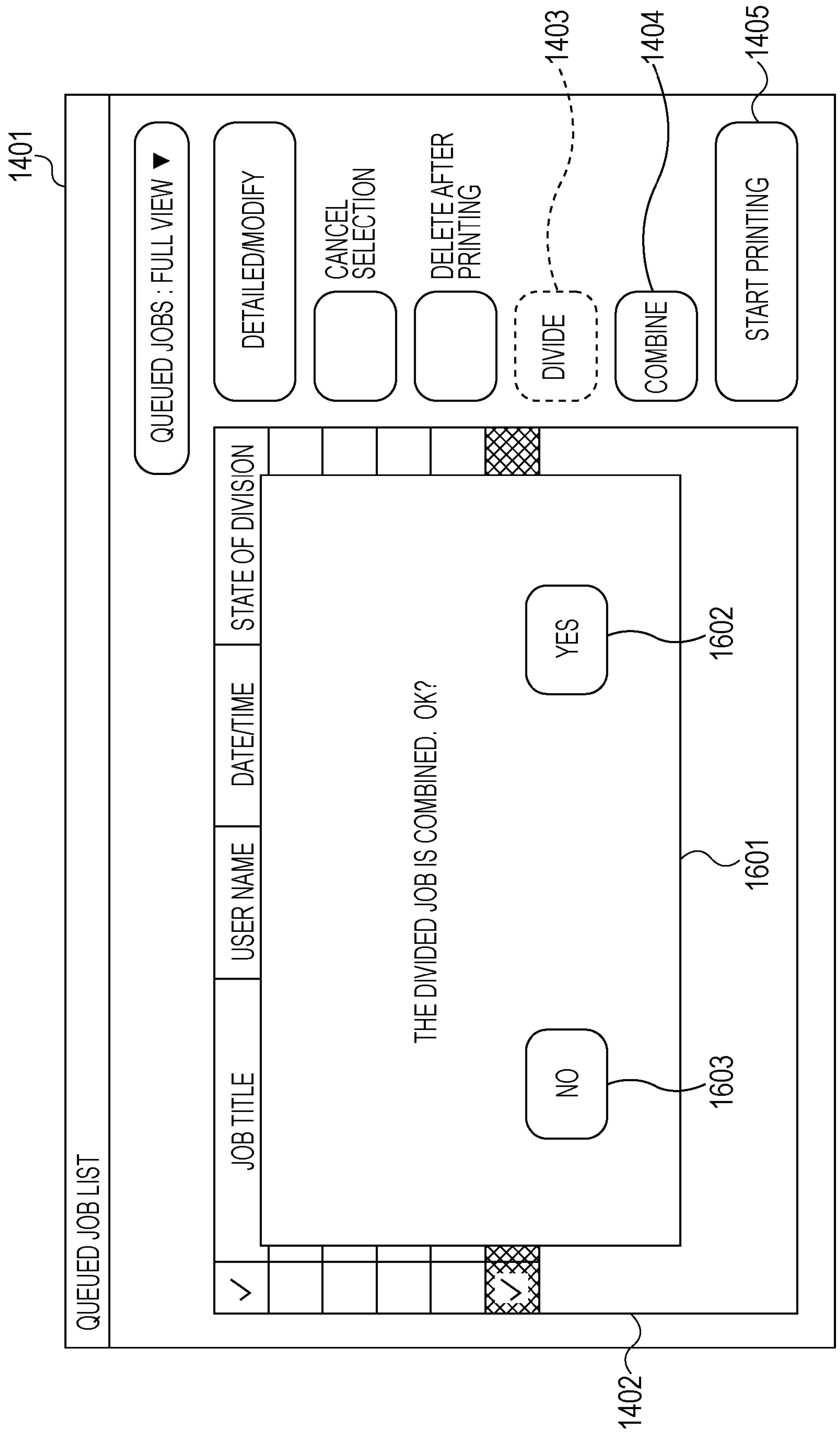
FIG. 15 is a diagram illustrating an exemplary screen on which a dialog for confirming whether a combining process is to be performed for a divided print job is shown.

FIG. 14 is a diagram illustrating an example of the "queued job list" screen 1401 which is displayed when a combining process is performed for a divided print job. FIG. 15 is a diagram illustrating an exemplary screen on which a dialog for confirming whether a combining process is to be performed for a divided print job is shown. FIG. 16 is a diagram illustrating an example of the "queued job list" screen 1401 which is displayed after the combining process has been performed for a divided print job.

As illustrated in FIG. 14, the user selects print jobs for which pre-processing and post-processing are to be combined from the list 1402 on the "queued job list" screen 1401. In the example illustrated in FIG. 14, a print job with job title "Brochure E" is currently selected. If the user selects a print job for which a combining process can be performed, the "combine" key 1404 is displayed in an active state to allow the pressing of the key 1404. When the user presses the "combine" key 1404 displayed in the active state, as illustrated in FIG. 15, a combining confirmation dialog 1601 for confirming whether a combining process is to be performed for the divided print job is shown on the "queued job list" screen 1401.

The combining confirmation dialog 1601 has a "YES" key 1602 and a "NO" key 1603. When the "YES" key 1602 is pressed, a process of combining the pre-processing and post-processing of the selected print job is executed. When the "NO" key 1603 is pressed, on the other hand, the combining confirmation dialog 1601 is closed and the "queued job list" screen 1401 appears. When the process of performing a combining process for the divided print job is executed, as illustrated in FIG. 16, the phrase "already combined" is shown in the state-of-division column of the print job with job title "Brochure E".

Next, a process of dividing a print job into pre-processing and post-processing and a process of performing a combining process for a divided print job according to the present embodiment will be described with reference to a flowchart of FIG. 17. In steps, screens are displayed on the operation unit 1902 and actual processing is performed by the job control unit 1901.

FIG. 17 is a flowchart illustrating the flow of a process of dividing a print job or performing a combining process on a print job.

First, in step S201, the job control unit 1901 displays the "queued job list" screen 1401 illustrated in FIG. 10 on the operation unit 1902.

Then, in step S202, the job control unit 1901 determines whether a print job has been selected from the list 1402. If a print job is currently selected, the process proceeds to step S203. If no print job has been selected, the process ends.

Then, in step S203, the job control unit 1901 determines whether or not the selected print job can be divided into pre-processing and post-processing. If the print job can be divided, the process proceeds to step S204, or, otherwise, the process proceeds to step S207.

In step S204, the job control unit 1901 displays the "divide" key 1403 on the "queued job list" screen 1401 in the active state. Then, in step S205, the job control unit 1901 determines whether or not the "divide" key 1403 has been pressed. If the "divide" key 1403 has been pressed and if the "YES" key 1502 has been pressed on the division confirmation dialog 1501, the process proceeds to step S206, in which the job control unit 1901 executes a process of dividing the selected print job into pre-processing and post-processing. If the "divide" key 1403 has not been pressed, the process ends.

In step S207, the job control unit 1901 determines whether or not the post-processing of the selected print job can be combined with the pre-processing thereof. If they can be combined, the process proceeds to step S208, or, otherwise, the process ends.

In step S208, the job control unit 1901 displays the "combine" key 1404 on the "queued job list" screen 1401 in the active state. Then, in step S209, the job control unit 1901 determines whether or not the "combine" key 1404 has been pressed. If the "combine" key 1404 has been pressed and if the "YES" key 1602 has been pressed on the combining confirmation dialog 1601, the process proceeds to step S210, in which the job control unit 1901 executes a combining process of combining the post-processing of the selected print job with the pre-processing thereof. If the "combine" key 1404 has not been pressed, the process ends.

Next, a process of determining the type of a print job to determine which finisher is to be used to execute post-processing according to the present embodiment will be described with reference to a flowchart of FIG. 18.

FIG. 18 is a flowchart illustrating a process of selecting a finisher to be used to execute post-processing. In steps, screens are displayed on the operation unit 1902, and actual processing is performed by the job control unit 1901.

First, in step S301, the job control unit 1901 displays the "queued job list" screen 1401 illustrated in FIG. 10 on the operation unit 1902.

Then, in step S302, the job control unit 1901 determines whether a print job has been selected from the list 1402. If a print job is currently selected, the process proceeds to step S303. If no print job has been selected, the process ends.

Then, in step S303, the job control unit 1901 determines whether or not to start printing, that is, whether or not the "start printing" key 1405 has been pressed. If the "start printing" key 1405 has been pressed, the process proceeds to step S304. If the "start printing" key 1405 has not been pressed, the process ends.

In step S304, the job control unit 1901 determines the type of the selected print job. If the selected print job is an integrated print job or a combined print job, the process proceeds to step S310. If the selected print job is a divided print job, the process proceeds to step S305, in which the job control unit 1901 executes printing (print-processing) on the divided print job.

The term "integrated print job" means, as described above with reference to the structure of the present embodiment, a job to be subjected to post-processing by the inline finisher 1803*a* in association with print-processing. The term "divided print job" means, as described above, a print job for which a post-processing separating instruction has been issued. The term "combined print job" means, as described above, a print job for which a post-processing combining instruction has been issued.

Then, in step S306, the job control unit 1901 determines whether or not a near-line finisher is to be used to execute post-processing on the divided print job. Specifically, the job control unit 1901 searches, on the basis of the post-processing setting information 905, for a near-line finisher that satisfies the post-processing setting information 905 using the post-processing-apparatus setting information 904. If a near-line finisher that satisfies the post-processing setting information 905 is found, the process proceeds to step S307, in which the job control unit 1901 transmits post-processing instruction data to the near-line finisher. If a near-line finisher that satisfies the post-processing setting information 905 is not found, the job control unit 1901 determines that an offline finisher is to be used to execute the processing. Then, the process proceeds to step S308, in which the job control unit 1901 prints an instruction sheet for an offline finisher.

In step S310, the job control unit 1901 executes printing on the integrated print job or combined print job. Then, the job control unit 1901 causes the inline finisher 1803*a* to execute post-processing of the print job (step S311).

According to the present embodiment, in order to execute print-processing on a print job from which post-processing has not been separated, print-processing necessary for the print job is executed by the printer 1803, and post-processing necessary for the print job is executed by the inline finisher 1803*a*. In order to execute print-processing on a print job from which post-processing has been separated, on the other hand, print-processing necessary for the print job is executed by the printer 1803, and post-processing necessary for the print job is executed by a near-line finisher or an offline finisher. As a result, in a case where a plurality of print jobs are input to the printing system at a time, post-processing can be executed by an inline, near-line, or offline finisher even in a situation where the processing of a print job is not started unless the processing of the preceding print job has completed. This can improve the overall productivity for the plurality of print jobs that require post-processing as well as print-processing.

In the present embodiment, the printer 1803 can separate post-processing from a print job on a finisher-by-finisher basis (in units of post-processing apparatuses). Furthermore, a print job divided into pre-processing and post-processing can be subjected to processing such as temporarily suspending the execution of post-processing or changing a finisher to be used to execute the post-processing. In a case where the execution of post-processing is suspended, setting information regarding the post-processing is stored. Such suspension or storage may be executed by, for example, the job control unit 1901.

In the present embodiment, two print jobs may be output with the same settings. Specifically, setting information of one of the print jobs is stored, and the stored setting information is used for the other print job. This can reduce the complexity of making the setting for print jobs. Two application cases are available. In a first case, setting information of the entirety of a print job is stored and is used for the other print job. In a second case, setting information regarding some of processes (for example, post-processing) constituting a print job is stored and is used for some of processes of the other print job.

The separated post-processing may be re-combined with the print job from which the post-processing has been separated or may be combined with another print job different from the print job from which the post-processing has been separated.

The stored setting information regarding post-processing may be used (employed) for another print job, or setting information regarding some of processes (for example, post-processing) of a print job may be used for post-processing of another print job. In the present embodiment, this structure may be achieved by, for example, the job control unit 1901.

Furthermore, the operation unit 1902 may be configured to allow the user to select the active or inactive display state of a key for causing a near-line finisher or an offline finisher to execute post-processing. Moreover, a history of printed jobs or a job list view may be displayed on the operation unit 1902 so that the user can select a finisher different from a finisher used in the previous printing operation each time a printing instruction is given. For instance, each time re-printing is performed, the execution of post-processing using an inline finisher or a non-inline finisher may be selected.

According to the present embodiment, a print job is divided into pre-processing and post-processing, and the execution of the post-processing may be suspended. This ensures that only the pre-processing can be preferentially executed depending on the operating state of a finisher to be used to execute the post-processing and that print-processing can be executed on the print job regardless of the operating state of the finisher.

By changing a finisher to be used to execute post-processing of a print job, an optimum finisher can be selected according to the operating state of finishers, and the productivity of post-processing can be improved. Furthermore, post-processing can be separated from a source print job and can also be combined with the source print job or another print job. Thus, an optimum combination of processes can be executed according to the state of the execution of print jobs. In addition, setting information of a print job or setting information regarding some of processes (for example, post-processing) of a print job may be stored and employed for the post-processing of the print job or for another print job. This can reduce the complexity and time-consuming labor required to input setting information.

The foregoing embodiment has been described with respect to the printer 1803 as an application example of the present invention. It is to be understood that the present invention can also be applied to the client PC 1801 to achieve advantages similar to those described above.

It is to be understood that the size, material, shape, and relative arrangement of the components described as illustrative in the foregoing embodiment can be modified as desired according to the structure of an apparatus to which the present invention is applied and various conditions, and the present invention is not limited to the foregoing embodiment.

The advantages of the present invention are achieved by executing a process as follows. For instance, a process is executed in which a storage medium having recorded thereon a software program (program code) implementing the functions of the foregoing embodiment is supplied to a system or an apparatus, and a computer (such as a CPU or a microprocessing unit (MPU)) of the system or apparatus reads the program code stored in the storage medium. In this case, a computer-executable program read from the storage medium achieves the functions of the foregoing embodiment, and the program and the storage medium storing the program constitute embodiments of the present invention.

Examples of the storage medium for supplying the program code may include a floppy disk, a hard disk, a magneto-optical disk, a compact disk read-only memory (CD-ROM), a compact disc recordable (CD-R), a CD rewritable (CD-RW) disk, a digital versatile disk ROM (DVD-ROM), a DVD rewritable (DVD-RW) disk, a DVD+RW disk, a magnetic tape, a non-volatile memory card, and a ROM. The program code may be downloaded via a network.

According to an embodiment of the present invention, the program code read by the computer may be executed to achieve the functions of the foregoing embodiment. In addition, according to other embodiments of the present invention, an operating system (OS) or the like running on the computer may execute part of or the entirety of actual processing according to the instruction of the program code to achieve the functions of the foregoing embodiment.

In further embodiments of the present invention, the functions of the foregoing embodiment may be achieved by the following processes. The program code read from the storage medium is written in a memory of a function extension board placed in the computer or a function extension unit connected to the computer. Thereafter, a CPU or the like of the function extension board or the function extension unit executes part of or the entirety of actual processing according to the instruction of the program code.

According to another embodiment of the present invention, the program code read by the computer may be executed to achieve the functions of the foregoing embodiment. In addition, according to other embodiments of the present invention, an OS or the like running on the computer may execute part of or the entirety of actual processing according to the instruction of the program code to achieve the functions of the foregoing embodiment. In this case, the program is supplied directly from a storage medium having the program stored thereon, or by downloading it from another computer, database, or the like connected to the Internet, a commercial network, a local area network, or any other suitable network.

Therefore, the present invention is not limited to the foregoing embodiment, but can be modified in various manners (including an organic combination of embodiments) within the scope of the present invention. Such modifications may also fall within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-251314 filed Sep. 27, 2007, which is hereby incorporated by reference herein in its entirety.

What is claimed is:

1. A printing apparatus comprising:

a receiving unit adapted to receive a predetermined job, the predetermined job being adapted to cause a printing unit to perform print-processing and cause a post-processing apparatus to perform post-processing, and the post-processing apparatus being adapted to receive sheets supplied from the printing apparatus;

an inputting unit adapted to input a user's instruction to separate the post-processing from the print-processing in the predetermined job received by the receiving unit; and a controller adapted to cause the post-processing apparatus to perform the post-processing in the predetermined job and cause the printer to perform the print-processing in the predetermined job when the user's instruction is not input, and to cause the printer to perform the print-processing in the predetermined job without performing the post-processing by the post-processing apparatus when the user's instruction is input.

2. The apparatus according to claim 1, wherein the another post-processing apparatus includes a second receiving unit adapted to receive information about the post-processing via a network, and wherein the controller is adapted to transmit the information to the another post-processing apparatus via the network when the user's instruction is input.

3. The apparatus according to claim 1, wherein the another post-processing apparatus does not include a second receiving unit adapted to receive information about the post-processing via a network, and wherein the controller is adapted to cause the printer to print the information when the user's instruction is input.

4. The apparatus according to claim 1, wherein the receiving unit is adapted to sequentially receive a plurality of jobs, wherein the controller is adapted to control the user interface so that the user's instruction can be input for a job among the plurality of jobs for which the user's instruction is allowed, and wherein the controller is adapted to control the user interface so that the user's instruction is not input for a job among the plurality of jobs for which the user's instruction is not allowed.

5. The apparatus according to claim 1, wherein the controller is adapted to modify the predetermined job not to perform the post-processing and to perform the print-processing in response to inputting of the user's instruction.

6. The apparatus according to claim 5, wherein the controller is adapted to reassemble the predetermined job to perform the post-processing and the print-processing in response to inputting of another user's instruction after the user's instruction.

7. The apparatus according to claim 5, wherein the controller is adapted to cause an informing unit to inform a user of information, the information being information that enables the user to identify separation of the post-processing from the print-processing.

8. A job processing method of a printing apparatus comprising:

receiving a predetermined job, the predetermined job being adapted to cause a printing unit to perform print-processing and cause a processing apparatus to perform post-processing, and the processing apparatus being adapted to receive sheets supplied from the printing apparatus;

inputting a user's instruction to separate the post-processing from the print-processing in the received predetermined job;

causing the processing apparatus to perform the post-processing in the predetermined job and cause the printer to perform the print-processing in the predetermined job when the user's instruction is not input; and causing the printer to perform the print-processing in the predetermined job without performing the post-processing apparatus when the user's instruction is input.

9. A non-transitory computer-readable storage medium storing a program allowing a computer to execute the method according to claim 8.

* * * * *